US011750456B2

(12) United States Patent
Araujo et al.

(10) Patent No.: US 11,750,456 B2
(45) Date of Patent: *Sep. 5, 2023

(54) SECURE CONFIGURATION OF CLOUD COMPUTING NODES

(71) Applicant: Google LLC, Mountain View, CA (US)

(72) Inventors: Nelson Araujo, Redmond, WA (US); Mohsen Vakilian, Kirkland, WA (US); Stephen Francis Yegge, Kirkland, WA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/654,810

(22) Filed: Mar. 14, 2022

(65) Prior Publication Data

US 2022/0210013 A1  Jun. 30, 2022

Related U.S. Application Data

(63) Continuation of application No. 17/002,726, filed on Aug. 25, 2020, now Pat. No. 11,310,108, which is a
(Continued)

(51) Int. Cl.
*H04L 41/0813* (2022.01)
*G06F 9/50* (2006.01)
(Continued)

(52) U.S. Cl.
CPC ........ *H04L 41/0813* (2013.01); *G06F 9/5072* (2013.01); *H04L 41/0893* (2013.01);
(Continued)

(58) Field of Classification Search
CPC . H04L 41/0813; H04L 41/12; H04L 41/0897; H04L 41/0893; H04L 67/34;
(Continued)

(56) References Cited

U.S. PATENT DOCUMENTS 9,471,349 B1\* 10/2016 Stone .................... G06F 9/5061
9,547,485 B2\*  1/2017 Suzuki ............... G06F 9/45558
(Continued)

FOREIGN PATENT DOCUMENTS

KR     20150031502       3/2015
KR     20150031502 A     3/2015
(Continued)

OTHER PUBLICATIONS

JP Notice of Reason for Refusal in Japanese Application No. 2018-565727, dated Jan. 9, 2020, 6 pages (with English translation).
(Continued)

*Primary Examiner* — Jungwon Chang
(74) *Attorney, Agent, or Firm* — Honigman LLP; Brett A. Krueger

(57) ABSTRACT

Methods and systems for configuring nodes in a cloud computing network are described. One example method includes receiving, over a network, a configuration request from a particular node in the cloud computing network, the configuration request including node information for the particular node; verifying that the particular node is authorized for configuration based at least in part on the node information; in response to verifying that the particular node is authorized for configuration, identifying configuration actions to perform on the particular node based at least in part on the node information; and sending, over the network, a configuration command corresponding to one or more of the identified configuration actions to the particular node, wherein the particular node executes the configuration command upon receipt to perform the corresponding configuration actions.

18 Claims, 6 Drawing Sheets

Related U.S. Application Data continuation of application No. 16/310,229, filed as application No. PCT/US2016/037786 on Jun. 16, 2016, now Pat. No. 10,785,099.

(51) Int. Cl.
| | |
|---|---|
| *H04L 41/0893* | (2022.01) |
| *H04L 9/40* | (2022.01) |
| *H04L 67/00* | (2022.01) |
| *H04L 67/303* | (2022.01) |
| *H04L 67/125* | (2022.01) |
| *H04L 67/025* | (2022.01) |

(52) U.S. Cl.
CPC .............. *H04L 63/20* (2013.01); *H04L 67/34* (2013.01); *H04L 67/025* (2013.01); *H04L 67/125* (2013.01); *H04L 67/303* (2013.01)

(58) Field of Classification Search
CPC ... H04L 67/025; H04L 67/125; H04L 67/303; H04L 63/20; G06F 9/4558; G06F 9/5072; G06F 9/5061
See application file for complete search history.

(56) References Cited

U.S. PATENT DOCUMENTS

| | | | |
|---|---|---|---|
| 10,200,239 B2* | 2/2019 | Asayag | H04L 41/0897 |
| 10,785,099 B2 | 9/2020 | Araujo et al. | |
| 2006/0190575 A1 | 8/2006 | Harvey et al. | |
| 2011/0289134 A1 | 11/2011 | de los Reyes et al. | |
| 2012/0324070 A1 | 12/2012 | Campion et al. | |
| 2013/0117806 A1 | 5/2013 | Parthasarathy et al. | |
| 2014/0006581 A1 | 1/2014 | Raghu | |
| 2014/0040438 A1 | 2/2014 | Donahue et al. | |
| 2014/0047341 A1 | 2/2014 | Breternitz et al. | |
| 2014/0047434 A1 | 2/2014 | Lam et al. | |
| 2014/0108639 A1 | 4/2014 | Nelke et al. | |
| 2015/0378765 A1* | 12/2015 | Singh | G06F 9/45558 |
| | | | 718/1 |
| 2015/0381711 A1* | 12/2015 | Singh | H04L 41/12 |
| | | | 709/221 |
| 2016/0070597 A1* | 3/2016 | Riggin | G06F 9/45558 |
| | | | 718/1 |
| 2016/0241438 A1 | 8/2016 | Sundaram et al. | |
| 2016/0337356 A1 | 11/2016 | Simon et al. | |
| 2016/0342801 A1 | 11/2016 | Sreekanti et al. | |
| 2016/0364259 A1* | 12/2016 | Yoshida | G06F 9/45558 |
| 2017/0180308 A1 | 6/2017 | Viswanathan et al. | |
| 2017/0322788 A1 | 11/2017 | Baxter et al. | |

FOREIGN PATENT DOCUMENTS

| | | |
|---|---|---|
| WO | 2013108018 | 7/2013 |
| WO | 2013108018 A1 | 7/2013 |

OTHER PUBLICATIONS

KR Office ActioninKorean Appl cation No. 10-2019-7001416, dated Mar. 4, 2020, 10 pages, with English translation.
PCT International Preliminary Report on Patentability issued in International Application No. PCT/US2016037786, dated Aug. 2, 2018, 18 pages.
'cloud.google.com'[online] "Creating Groups ofInstances" Available on or before Mar. 8,x 2016 [retrieved on Mar. 8, 2016] Retrieved from Internet: URL<https://cloud.google.com/compute/docs/instance-groups/> 13 pages.
'cloud.google.com' [online] "Google Cloud Platform," Available on or before Mar. 8, 2016 [retrieved on Mar. 8, 2016] Retrieved from Internet: URL< https://cloud.google.com/deployment- manager/docs/step-by-step-guide/installation-and-setup> 49 pages.
'docs.ansible.com' [online] "Intro to Playbooks—Ansible Documentation" Last updated Feb. 26, 2016 [retrieved on Mar. 8, 2016] Retrieved from Internet: URL<https://docs.ansible.com/ansible/latest/user guide/playbooks intro.html> 14 pages.
'docs.aws.amazon.com' [online] "AWS CloudFormation User Guide: API Version May 15, 2010," May 15, 2010, [retrieved on Dec. 13, 2018] Retrieved from Internet via the Wayback Internet Archive: URL<https://web.archive.org/web/20160310173347 /https://docs.aws.amazon.com/ AWSCloudForm ation/latest/UserGuide/cfn-ug.pdf> 925 pages [Split into 9 parts].
'docs.puppetlabs.com' [online] "Understanding Puppet Core," Available on or before Mar. 8, 2016 [retrieved on Mar. 8, 2016] Retrieved from Internet: URL<https://docs.puppetlabs.com/pe/2016.3/puppet assign configurations.html> 25 pages.
'docs.saltstack.com'[online] "Saltstack Walk-Through," Available on or before Mar. 8, 2016, [retrieved on Mar. 8, 2016] Retreived from Internet: URL<https://docs.saltstack.com/en/latest/topics/tutorials/walkthrough.html> 10 pages.
'epamcloud.blogspot.com' [online] "Automatic Configuration of Virtual Machines in the Cloud Using Metadata," Serhiy Topchiy, Feb. 7, 2013, [retrieved on Mar. 8, 2016] Retrieved from Internet: URL<http://epamcloud. blogspot.com/2013/02/automatic-configurationofvirtual. <http://epamcloud.blogspot.com/2013/02/automaticconfigurationofvirtual> Html> 12 pages.
'pages.chef.io' [online] "Automation and the DevOps Workflow," Chef Software, Inc., Oct. 2015, [retrieved on Dec. 13, 2018] Retrieved from Internet: URL<https://pages.chef.io/rs/255-VFB-268/images/automation-and-the-devops-workflow.pdt> 16 pages.
'www.terraform.io' [online] "Build Infrastructure," Available on or before Mar. 8, 2016, [retrieved on Mar. 8, 2016] Retrieved from Internet: URL< https://leam.hashicorp.com/terraform/getting-started/build.htrnl> 7 pages.
Gronli et al. "Context-aware and Automatic Configuration of Mobile Devices in Cloud-enabled Ubiquitous Computing," Personal and Ubiquitous Computing 18(4), Apr. 2014, 19 pages.
PCT International Search Report and Written Opinion issued in International Application No. PCT/US2016037786, dated Mar. 8, 2017, 13 pages.
PCT Written Opinion issued in International Application No. PCT/US2016/037786, dated May 22, 2018, 7 pages.
Wood et al. "An Investigation into cloud configuration and security," Internet Technology and Secured Transactions, Nov. 8, 2010, 6 pages.
European Patent Office—Office Action for the related Application No. 16731768.4, dated Dec. 4, 2020, 9 pages.
USPTO, Office Action for U.S. Appl. No. 17/002,726, dated Aug. 19, 2021.
'cloud.google.com' [online] "Creating Groups ofInstances" Available on or before Mar. 8,x 2016 [retrieved on Mar. 8, 20168] Retrieved from Internet: URL<https://cloud.google.com/compute/docs/instance-groups/> 13 pages.

\* cited by examiner

SECURE CONFIGURATION OF CLOUD COMPUTING NODES

CROSS REFERENCE TO RELATED APPLICATIONS

This U.S. patent application is a continuation of, and claims priority under 35 U.S.C. § 120 from, U.S. patent application Ser. No. 17/450,932, filed on Oct. 14, 2021, which is a continuation of U.S. patent application Ser. No. 17/002,726, filed on Aug. 25, 2020, which is a continuation of U.S. patent application Ser. No. 16/310,229, filed on Jun. 16, 2016, now U.S. Pat. No. 10,785,099, which is a National Stage Application under 35 U.S.C. § 371 that claims the benefit of International Application No PCT/US2016/37786, filed on Jun. 16, 2016 The disclosures of these prior applications are considered part of the disclosure of this application and are hereby incorporated by reference in their entireties.

BACKGROUND

This specification generally relates to securely configuring nodes in a cloud computing system.

In a cloud computing network, multiple computing devices may be connected by a network and perform computing tasks cooperatively and/or in parallel. Large distributed systems may include hundreds or even thousands of separate computing devices. The computing devices may be homogenous (sharing the same configuration) or heterogeneous (having a variety of configurations). The computing devices may further host virtual environments allowing multiple computing nodes (e.g., virtual machine instances, container instances) to be hosted on a single physical computing device.

SUMMARY

In general, one aspect of the subject matter described in this specification may be embodied in systems, and methods performed by data processing apparatuses that include the actions of receiving, over a network, a configuration request from a particular node in the cloud computing network, the configuration request including node information for the particular node; verifying that the particular node is authorized for configuration based at least in part on the node information; in response to verifying that the particular node is authorized for configuration, identifying configuration actions to perform on the particular node based at least in part on the node information, and sending, over the network, a configuration command corresponding to one or more of the identified configuration actions to the particular node, wherein the particular node executes the configuration command upon receipt to perform the corresponding configuration actions.

In general, one innovative aspect of the subject matter described in this specification can be embodied in methods that include controlling software deployment by a configuration controller, wherein the software is deployed by a configuration manager out of a group of configuration managers to a node in a cloud computing environment. One such method includes requesting the configuration controller, by the node, to configure the node; determining, by the configuration controller, the configuration manager to be used to configure the node, establishing, by the configuration controller, a trust relationship between the node and the configuration manager, and deploying software on the node using the configuration manager based on the established trust relationship.

In another aspect, the configuration manager may be predetermined by an administrator from the group of configuration managers.

In some aspects, the trust relationship may be established between a client and a server of the configuration manager, wherein the deployment occurs on said client of software provided by said server, and wherein said client is executing on the node.

In some aspects, the configuration controller maintains information about the node, a status of the software deployment on the node, and/or one or more actions to be taken upon receiving a configuration, upon successful node configuration, or upon occurrence of a failure In another aspect, the software to be deployed on the node is specified by a configuration that is decided by the configuration controller.

In another aspect, the configuration is provided by the administrator to the configuration controller.

In some aspects, keys to access the cloud computing environment and/or the configuration manager are stored and kept secret by the configuration controller, and the configuration controller uses said keys to establish the trust relationship.

In another aspect, keys to access the cloud computing environment and/or the configuration manager are created and stored by an entity which is known to the configuration manager, wherein the entity can be the cloud computing environment, the configuration manager, or a trusted third party, and the configuration controller uses said knowledge to establish the trust relationship. In some cases, the keys are cryptographic keys.

In some aspects, establishing a trust relationship between a first party and a second party means providing a credential to the first party that is usable to authorize access the second party, or providing credentials to each party that are usable to authorize access to the respective other party.

In some implementations described herein, the process of verifying that the particular node is authorized for configuration/establishing a trust relationship between a node and the configuration manager provides a layer of indirection to increase overall security of the system and facilitate secure configuration. In some cases, the process removes an individual node's ability to control how it is configured, thus preventing an unauthorized, unverified, or compromised node from requesting configuration resources, which may include sensitive information, in an ad hoc manner. This may reduce the risk that unauthorized, unverified, or compromised nodes may access sensitive configuration information.

The process may also provide flexibility by integrating with different existing configuration managers, thereby allowing an administrator to choose which configuration manager to be used for configuring a particular node integrating with different configuration managers and configuration tools may also allow the process to be implemented in heterogeneous cloud computing networks utilizing multiple configuration managers and configuration tools. The process may also be implemented using common client-server protocols for communication, thereby allowing for minimal reconfiguration of existing networks and systems.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
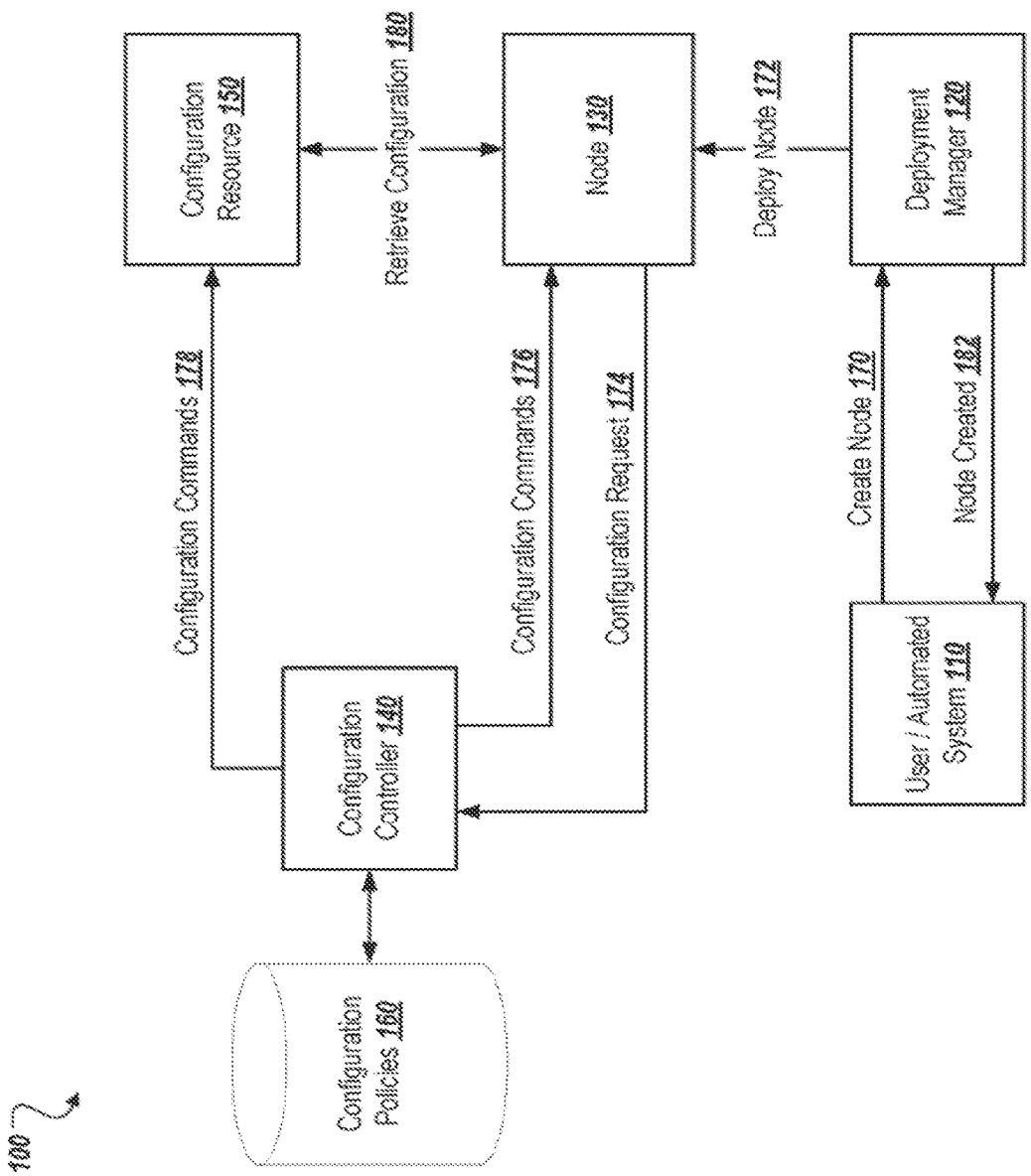
FIG. 1 is a diagram of an example environment for securely configuring resources in a cloud computing system.

Configuration managers, such as CHEF™, PUPPET, SALT, and ANSIBLE, are software programs for deploying software to computing devices over a network. These configuration managers are often used in on-premises environments to distribute software over internal networks. Because these configuration managers provide many useful features, efforts have been made to use them in larger scale cloud computing systems. However, because these configuration managers are mainly designed for internal network use, many features desirable in a cloud computing system, such as robust security, interoperability with other frameworks, and elastic deployment capabilities have hindered such efforts to date.

The present disclosure describes methods and systems for securely configuring nodes in a cloud computing system. The described solution makes use of the existing configuration managers as resources to provide configuration items to nodes during the configuration process The solution may support multiple different types of configuration managers with different application programming interfaces (APIs), and may allow them to be used together in a single cloud computing system. Further, the solution provides support for elastic deployment of resources, such as in response to increased demand for resources or changing network conditions. In addition, security measures, such as the allocation, distribution, and management of access credentials for potentially sensitive configuration resources, is managed entirely by the described system rather than the configuration resources or the nodes in the cloud computing system.

The described solution adds a layer of indirection between the configuration manager and nodes under configuration. For example, when a node is configured by a configuration resource, a trust relationship may be established between the node to be configured and the configuration resource. Generally, either the configuration resource, or the node, are part of a trusted computing base to ensure a secure configuration process (e.g., that unauthorized or unverified nodes are prevented from accessing requests configuration resources, which may include sensitive information). In the solution described herein, a configuration controller that is included in the trusted computing base may broker trust relationships between nodes and configuration resources, so that the node and the configuration resource may establish mutual trust without themselves being part of the trusted computing base. The configuration controller may establish this trust relationship, for example, by configuring access credentials for the node on the configuration resource and providing the credentials to the node for use in accessing the resource Based on this layer of indirection provided by the configuration controller, secure configuration of a node may be achieved without the node or the configuration resource being part of the trusted computing base. The trusted computing base may include, for example, components within the system that manage and secure potentially sensitive access credentials.

An administrator may configure the system with a set of configuration policies defining which configuration from which configuration manager should be applied on particular nodes The configuration policies may be specified as a set of rules. Each rule matches the properties of a node (e.g., name, creation date, owner, etc.) to a set of configuration data Each rule may also specify configuration actions for the system to take upon a successful or unsuccessful node configuration In order to obtain a configuration, a node sends a request to the system (e.g., over a network). When the system receives a request to configure a machine, it finds one or more Riles within the configuration policies that match the properties of the node to determine the configuration actions to perform.

The present solution may integrate with existing configuration managers to provide elasticity through automatic node configuration in response to demand for resources Existing configuration managers generally work in an interactive environment in which an administrator uses the configuration manager interactively to provision new nodes. This interactive scenario may not be useful for elastic scenarios in which customers want to provision nodes in response to the current state of the system. The present solution augments the ability of the administrator to provision nodes on demand and makes the configuration managers applicable to elastic scenarios. This integration capability with existing solutions also makes the present system more easily deployed in a variety of different existing cloud configurations, each of which may use one or more configuration managers with which the present system can integrate.

Regarding security, some cloud configuration managers may provide access credentials (e.g., encryption keys, login credentials, etc.) to a node under configuration so it can access network resource(s) to obtain items needed for configuration (e.g., software libraries, source code, etc.) Such a configuration may present a security risk, as an attacker can breach any number of nodes to obtain these access credentials. The present disclosure describes a system in which access credentials may be managed by the configuration system and need not be managed or maintained by the nodes being configured. This aspect increases overall security of the system and facilitates secure configuration. Further, the present system removes an individual node's ability to control how it is configured, thus preventing a compromised node from requesting configuration resources, which may include sensitive information, in an ad hoc manner. This reduces the risk that unauthorized, unverified, or compromised nodes may access sensitive configuration information.

The present solution may also provide increased security by verifying that a particular node requesting configuration is in fact authorized to be so configured. The system may correlate a configuration request received from a particular node with a corresponding action by an administrator to verify that the node is authorized to be configured. The system may also direct the node to execute various instructions and provide the output of the instructions to verify that the node is genuine and not, for example, a compromised node being directed by an attacker. For example, the system may direct the node to execute a large number of calculations in a short amount of time to verify that the compromised node is not being controlled manually by a human attacker The system may also direct the node to provide information, such as a unique identifier, included with its initial configuration. Such information can be correlated with the original creation request for the node to verify that the node is authorized to receive configuration.

FIG. 1 is a diagram of an example environment 100 for securely configuring resources in a cloud computing system. As shown, the environment 100 includes a user or automated system 110 in communication with the deployment manager 120. The deployment manager 120 deploys a node 130 (e.g., a virtual machine instance, a container instance, or other component of a cloud computing system) in response to a request from the user/automated system 110. A configuration controller 140 interacts with the node 130 to provide it with a configuration. The configuration controller 140 operates based on configuration policies 160. The configuration controller 140 also interacts with the configuration resource 150 to authorize the node 130 to retrieve configuration items from the resource. In operation, the user/automated system 110 requests that the deployment manager 120 create a node (170). In response, the deployment manager 120 deploys node 130 (172). Upon initialization, the node 130 sends a configuration request 174 to the configuration controller 140. The configuration controller 140 identifies a configuration policy 164 the node 130 based on parameters included in the configuration request 174. The configuration controller 140 issues configuration commands 176 to the node 130 The node 130 executes the configuration commands 176, and provides results of the commands to the configuration controller 140. The configuration controller 140 may also send configuration commands 178 to the configuration resource 150. For example, the configuration for configuration controller 140 may configure the configuration resource 150 to authorize the node 130 to retrieve configuration items (180) from the configuration resource 150. The configuration controller 140 may also configure the node 130 (e.g., via the configuration commands 176) with access credentials allowing it to access the configuration resource 150.

The user/automated system 110 is an entity that requests node instances, such as node 130, be deployed by the deployment manager 120. For example, the user/automated system 110 may include user interacting with a user interface to create a new node instance. User/automated system 110 may also include an automated system that automatically requests creation of node instances from the deployment manager, such as, for example, in response to an increase in the demand for computing resources for particular application, a decrease in performance of a cloud computing system managed by the deployment manager 120, or in response to other events. In some implementations, the user/automated system 110 may communicate with the deployment manager 120 over a network (not shown) in order to request the creation of a node (170), and to receive an acknowledgment that the node was created (182). Additional information, such as an identity of the user/automated system 110, attributes of the node to be created, or other information, may be present in the creation request (170) and acknowledgement (182), as discussed in greater detail below.

The deployment manager 120 may be a computing component in a distributed computing environment such as a cloud computing system. In some implementations, the deployment manager 120 may be one or more computing components operable to deploy new node instances and manage existing node instances within the distributed computing environment. In some cases, the deployment manager 120 may be implemented as a software component, and may provide an API allowing entities, such as the user/automated system 110, to request creation of new nodes within the distributed computing environment. In some implementations, the deployment may be a hypervisor component that deploys and manages nodes within one or more virtual execution environments. In such a case, the nodes deployed and managed by the hypervisor may be virtual machine instances, container instances, virtual resources (e.g., disks, processors, etc.), or other virtual components.

The node 130 is deployed by the deployment manager 120 at 172. The node 130 may be a node instance deployed and executed by physical computing device inside a virtual environment. In some cases, the node 130 may be created according to a virtual machine or container image associated with the deployment manager 120 and specified by the user/automated system 110 in the creation request 170. In some implementations, the node 130 may be deployed with a minimal configuration sufficient to allow it to communicate with the configuration controller 140. For example, the node 130 may be deployed with a minimally configured operating system, a limited network configuration allowing it to access the configuration controller 140 over a network (not shown), and instructions to send the configuration request 174 to the configuration controller 140 and wait for a response from the configuration controller 140. Such a deployment may allow the configuration controller 140 to control most aspects of the configuration of the node 130. In contrast, a node deployed with a non-minimal configuration may include configuration settings, software packages, and other configuration items within the image used to create the node. Such an approach may lead to difficulty in making changes to initial configurations for new nodes, as the image from which the nodes are created must be updated to implement such changes. The present solution may also be utilized in situations where nodes are deployed with such non-minimal configurations, such as, for example, to update pre-installed software packages to the latest versions, to change settings included within the initial configuration in the image to updated values, and to perform other configuration actions. Such an approach may alleviate some of the difficulties of changing initial configurations included in an image, as a non-minimally configured node 130 may request and receive configuration from the configuration controller 140 upon initialization in the same manner as a minimally configured node.

The configuration controller 140 receives the configuration request 174 from the node 130 over a network (not shown). In some implementations, the node 130 sends the configuration request 174 according to a Representational State Transfer (REST) API provided by the configuration controller 140. The node 130 may be instructed to access a Uniform Resource Locator (URL) corresponding to the configuration controller 140 using Hypertext Transfer Protocol (HTTP), HTTP Secure (HTTPS), or other protocols. For example, the node 130 may send an HTTP request for the URL "http://configcontroller.internal.net/start" to the configuration controller 140, where the domain name "configcontroller.internal.net" resolves to a network address associated with the configuration controller 140, and the target "start" indicates to the configuration controller 140 that the node 130 is requesting configuration.

The configuration request 174 may also include identifying information about the node 130. For example, the user/automated system 110 may specify information about the node 130 to be created by the deployment manager 120, such as a type of node instance, an identity of the user or system requesting creation of the node 130, a unique identifier for the request to create the node, or other information. In some cases, this information may be encoded in the configuration request 174. In some implementations, the configuration controller 140 may use this information to verify that the node 130 is authorized to be configured. For example, the configuration controller 140 may receive the unique identifier for the request to create the node in the configuration request 174, and may use this identifier to verify that the node 130 has in fact been deployed and is requesting configuration based on the valid creation request. Such verification may provide increased security by preventing unauthorized node instances from gaining access to internal, and possibly sensitive, configuration data. In one example, such a node instance to be created by a malicious entity attempting to gain access to such internal data. The configuration controller 140 may also verify that the node instance was created by a user or system that is authorized to create node instances with the specific attributes of the node requesting configuration.

In some implementations, the configuration controller 140 may receive the configuration request 174 from the deployment manager 120. In such a case, when the deployment manager 120 deploys a new node, it may send the configuration request 174 to the configuration controller 140 with information about the newly deployed node. The configuration controller 140, as in the node-initiated configuration scenario described above, may use the information about the node in a similar manner to that described above to identify and verify the identity of the node prior to configuring it.

In some implementations, the configuration controller 140 may be configured to scan the network for newly deployed nodes waiting for configuration. In such a case, the configuration controller 140 would not receive a configuration request 174 to initiate configuration of a particular node, but would instead initiate the configuration process when a node that is waiting for configuration is found. For example, the configuration controller 140 may periodically check a database or other resource containing a list of nodes waiting for configuration, and may initiate communication with such nodes to begin the configuration process. The configuration controller 140 may also send a broadcast message on the network indicating that it is ready to configure any newly deployed nodes. In such a case, the newly-deployed nodes would be configured to respond to this broadcast message to begin the configuration process.

The configuration controller 140 may use the information from the configuration request 174 to identify one of the configuration policies 160 to use for configuring the node 130. In some implementations, a configuration policy 160 may include a rule and a set of configuration commands to perform when a node to be configured matches the rule. For example, a configuration policy 160 may specify that a node to be configured with a node type of "database" should have a database management software program installed during the configuration process. If the configuration controller 140 receives the configuration request from a node 130 specifying the type of the node 130 is "database," the configuration controller will identify that the node 130 matches configuration policy 160 for the node type "database," and will issue the configuration commands defined in the configuration policy 160 to the node 130 to install the database management software program. The rules in the configuration policies 160 may include criteria specifying matching values for information received in the configuration request received from the node 130. In some implementations, the configuration policy 160 may specify particular configuration resource 152 use to perform the configuration.

Once the configuration controller 140 identifies the configuration policy 162 used for configuring the node 130, the configuration controller 140 may send one or more configuration commands 176 to the node 130. As previously discussed, node 130 listens for such commands from the configuration controller 140 after sending the configuration request 174. In some implementations, when the node 130 receives the configuration command 176, the instructions with which it is deployed cause it to execute the received command, and provide the outputs or results of the executed command to the configuration controller 140.

This arrangement may provide increased flexibility in configuring the node 130, as the configuration controller 140 may instinct the node 130 to execute effectively any command that could be executed by user entering commands directly to the node 130. In some implementations, the node 130 may execute each received configuration command 176 in an operating system shell or command line interface, such as, for example, Bourne shell (sh), Bourne-Again shell (bash), Korn shell (ksh), C shell (csh). or other shells or command line interfaces. Such an arrangement may allow the configuration controller 140 to utilize the rich features of such shells in configuring the node 130, such as scripting and flow control operations such as redirects ("×") and pipes ("|").

For example, in response to the example configuration request 174 from a node 130 of type "database," the configuration controller 140 may send the node 130 a configuration command 176 to configure a package management client on the node 130, such as Advanced Packaging Tool (APT), RPM Package Manager, or other client, to access a particular configuration resource 150 For example, this configuration command 176 may be "add-apt-repository 'deb http://config.blah.com/config/database-manager main'", wherein "http://config.blah.com/config/" is a URL corresponding to the resource 150. The node 130 may receive the configuration command 176, and execute it in a shell or command line interface as described above. Execution of the configuration command 176 will cause the "add-apt-repository" program on the node 130 to be executed with the specified parameters, which, in this case, will cause the configuration of the APT package management client program to be updated. The configuration controller 140 may then send a configuration command 176 invoking the package management client on the node 130 and instructing it to retrieve an appropriate package. For example, the configuration command 176 to retrieve the "database-manager" component from the previous example may be "apt-get install database-manager". The node 130 may receive the configuration command 176, and execute it in a shell or command line interface as described above. Execution of the configuration command 176 will cause the "add-get" program on the node 130 to be executed with the specified parameters, which in this case will cause the node 130 to retrieve and install the "database-manager" software package from the configuration resource 150 configured with the previous command.

The configuration controller 140 may also send configuration commands 176 selected to further verity that the node 130 is authorized to be configured. For example, the configuration controller 140 may instruct the node 130 to perform a series of computations and provide results within a certain time period. Such a mechanism may be used to verify that the node 130 is in fact a computing resource, and not a human attacker attempting to gain electronic access to the system. The time period may be chosen such that it would not be feasible for human attacker to perform the computations before the time period expires. In another example, the configuration controller 140 may instruct the node 130 to read immutable characteristics of its environment, such as a physical Medium Access Control (MAC) address, serial number, or other unique identifier of the physical computing device on which it is executing. The node 130 may provide this data to the configuration controller 140 for verification. Such a check may ensure that the node 130 is the node instance deployed by the deployment manager 120 in response to the request from the user/automated system 110, and not an attacker mimicking the deployed instance for a possibly malicious purpose.

The configuration resource 150 may be a computing component or set of computing components from which the node 130 may retrieve configuration items (180). For example, the configuration resource 150 may be a configuration management server executing a configuration management tool such as, for example, CHEF™, PUPPET, SALT, ANSIBLE, or another configuration management tool. The configuration resource 150 may also be a database, depository, or other collection of configuration items. In some implementations, the configuration controller may be configured to communicate with multiple different types of configuration resources 150 using APIs, communications protocols, or other mechanisms specific to each particular type of configuration resource 150. The configuration controller 140 may send configuration commands 178 to the configuration resource 150 in order to authorize the node 130 to access the configuration resource 150. The configuration controller 140 may similarly send configuration commands 176 to the node 130 providing it with credentials to use when accessing the configuration resource 150. In some cases, such credentials may be limited such that the node 130 is granted only the level of access it needs to be configured. For example, the node 130 may be provided with access credentials for the configuration resource 150 created by the configuration controller 140 when the configuration process begins, and deleted by the configuration controller 140 when the configuration process ends. Such techniques may lead to increased security over previous techniques by alleviating the need for the node 130 to store and maintain its own access credentials for the configuration resource 150. Instead, the configuration controller 140 may manage such credentials, and only provide them to the node 130 when necessary for configuration. This may limit resources that can be accessed by an attacker who gains control of the node 130, and limits the number of components within the system that need to manage and secure potentially sensitive access credentials.

In some implementations, the interactions between the components shown in FIG. 1 may be implemented as messages sent between the components over one or more networks to which the components are connected. For example, the one or more networks may include Internet Protocol (IP) or other types of networks, and may utilize the Transmission Control Protocol (TCP), Universal Datagram Protocol (UDP), or other protocols at the transport layer. The messages sent between the components may be constructed according to a communications protocol, such as, for example. Hypertext Transfer Protocol (HTTP), Remote Procedure Call (RPC). Simple Object Access Protocol (SOAP), or other communications protocols. The one or more networks may be implemented using one or more physical layer networking technologies including, but not limited to, Ethernet, Synchronous Optical Networking (SONET), Asynchronous Transfer Mode (ATM), and other wired or wireless networking technologies In some implementations, the configuration controller 140 may update existing nodes on the network in a staggered manner. In such a rolling update process, the configuration controller 140 selects nodes to receive an updated configuration based on specified criteria. For example, the criteria may specify that nodes on the network be updated at a rate of 100 per hour. In response, the configuration controller 140 may select 100 nodes per hour and instruct these nodes to obtain the updated configuration in the same manner described above. In some cases, the configuration controller 140 may initiate the update process by sending a message to the nodes to be updated. The configuration controller 140 may also receive a message from each node to be updated initiating the update process. The configuration controller 140 may also receive a message from the deployment manager 120 initiating the update process.

Figure 2:
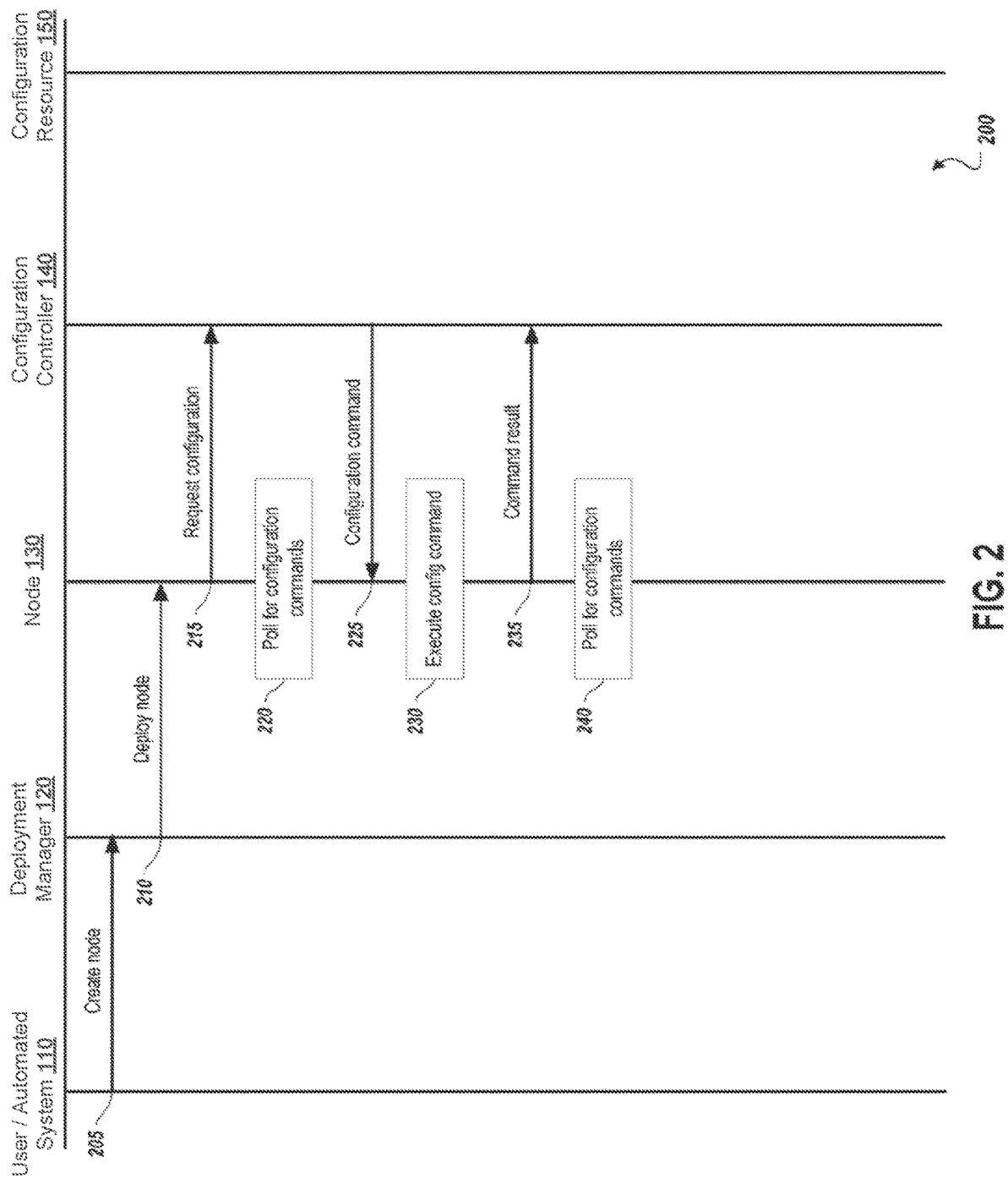
FIG. 2 is a swim lane diagram of an example process for securely configuring resources in a cloud computing system.

FIG. 2 is a swim lane diagram of an example process for securely configuring resources in a cloud computing system. At 205, the user-automated system 110 requests that the deployment manager 120 create a node. At 210, the deployment manager 120 creates and deploys the node 130. At 215, the node 130, par initialization, sends a message to the configuration controller 140 requesting configuration. At 220, the node 130 polls for configuration commands from the configuration controller 140. In some Implementations, the node 130 may enter a "busy wait" loop in which it periodically checks for configuration commands received from the configuration controller 140.

At 225, in response to receiving the request for configuration from the node 130, the configuration controller 140 sends a configuration command to tire node 130. At 230, the node 130 executes the received configuration command. As 235, the node 130 sends a result of the configuration command to the configuration controller 140. For example, the node 130 may execute the configuration command in an operating system shell, and provide the outputs of the executed command to the configuration controller 140 as a result. At 240, the node 130 again polls for configuration commands from the configuration controller 140.

Figure 3:
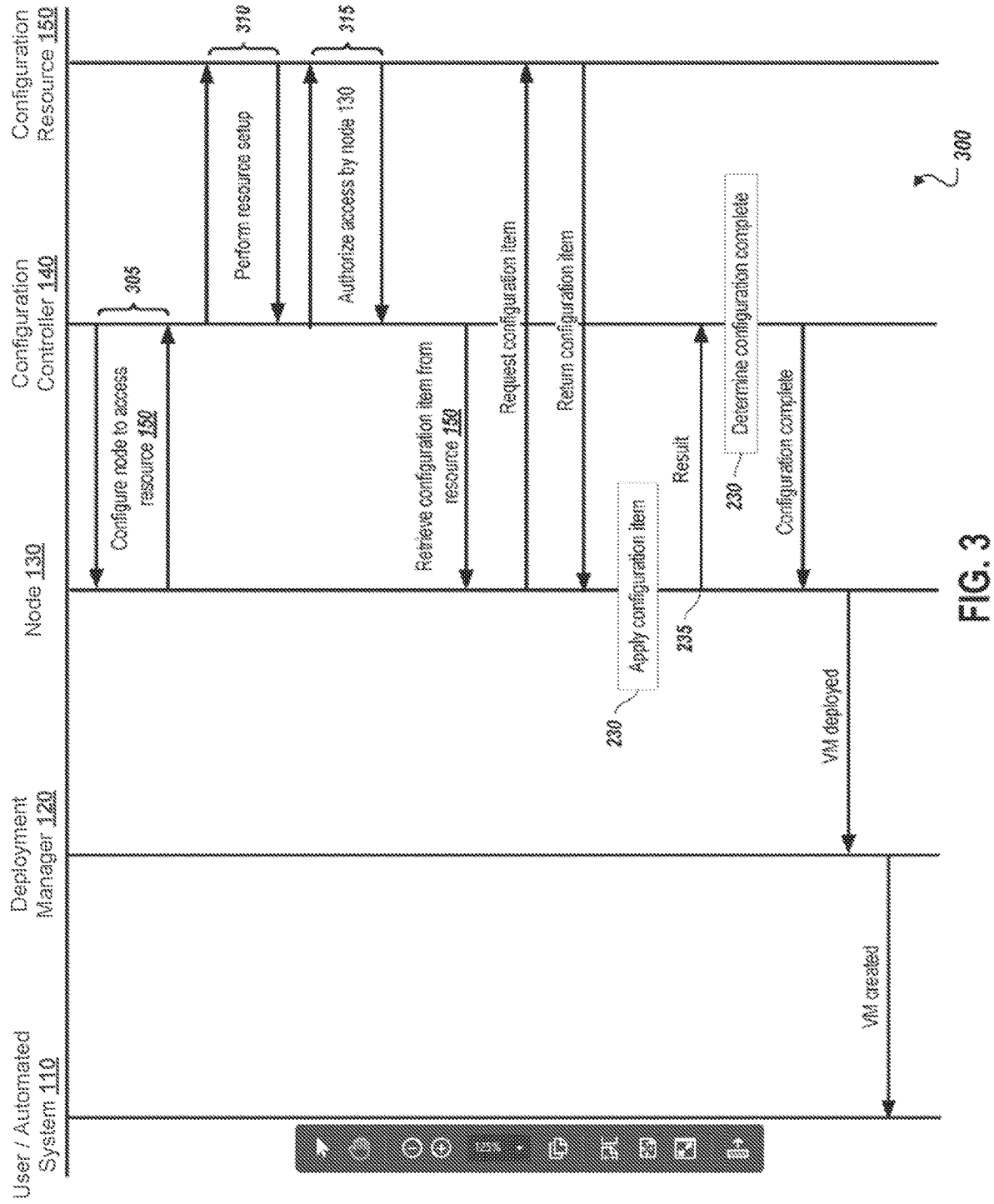
FIG. 3 is a swim lane diagram of an example process for securely configuring resources in a cloud computing system.

FIG. 3 is a swim lane diagram of an example process for configuring a node 130 and a configuration resource 150 using the configuration controller 140. At 305, the configuration controller 140 configures the node 130 to access the configuration resource 150. For example, the configuration controller 140 may provide the node 130 with information for accessing the configuration resource 150, such as a network address with which to contact the configuration resource 150, access credentials to use to access the configuration resource 150, or other information. In some implementations, the configuration may occur after the configuration controller 140 prepares the configuration resource at 310 and 315 (described below). In some implementations, the configuration controller 140 may install a client application associated with the configuration resource 150 on the node 130, and may invoke this client application when instructing the node 130 to retrieve configuration items from the configuration resource 150.

At 310, the configuration controller 140 performs setup operations to prepare the configuration resource 150 to provide configuration items to the node 130. In some implementations, such setup operations may include determining whether the configuration resource 150 can provide the particular configuration items necessary to configure the node 130. At 315, the configuration controller 140 instructs the configuration resource 150 to authorize the node 130 to access the configuration resource 150. For example, the configuration controller 140 may create a set of access credentials on the configuration resource 150 for the node 130 In some cases, the configuration controller 140 may provide the configuration resource 150 with information about the node 130, such as its network address or other identifying information, so the configuration resource 150 can verify the node 130 when it attempts to access the resource In some implementations, the configuration controller 140 may perform steps 310 and 315 by utilizing an API specific to the configuration resource 150. The configuration controller 140 may be operable to communicate with multiple different types of configuration resources 150 using multiple different APIs.

At 320, the configuration controller 140 instructs the node 130 to retrieve configuration items from the configuration resource 150. For example, the configuration controller 140 may instruct the node 130 to invoke the client application installed at 305 to access the configuration resource 150. The configuration controller 140 may include identification of the configuration item or configuration items to be retrieved. In some implementations, the configuration controller 140 may instruct the node 130 to send a message constructed according to a protocol particular to the configuration resource 150 over the network to retrieve the configuration item. At 330, the configuration resource 150 returns the configuration item indicated by the request sent at 325.

At 335 the node 130 applies the configuration item received from the configuration resource 150. In some implementations, applying the configuration item may include the client application associated with the configuration resource 150 installing the received configuration item on the node 130. The node 130 may also return a result to the configuration controller 140 when it receives the configuration item from the configuration resource 150 at 330. In response, the configuration controller 140 may send the configuration command to the node 130 including instructions to install the configuration item. At 340, the node 130 sends a result of applying the configuration item to the configuration controller 140. In some implementations, steps 320 through 340 may be repeated multiple times to apply multiple different configuration items to the node 130. The configuration policy 160 identified by the configuration controller 140 for the node 130 may specify which configuration items are to be installed on the node 130, and thus may specify number of times and with what parameters steps 320 through 340 may repeat.

At 345, the configuration controller 140 determines the configuration of the node 130 is complete. In some implementations, the configuration controller 140 may determine that the configuration is complete based on receiving a successful result from the node 130 for each configuration item to be applied to the node 130. At 350, the configuration controller 140 sends an indication to the node 130 that the configuration process is complete. At 355, the node 130 sends an indication to the deployment manager 120 has been successfully deployed. At 360, the deployment manager 120 sends an indication to the user/automated system 110 that the node 130 has been successfully created. In some implementations, the configuration controller 140 does not receive a successful result from the node 130 for one or more of the configuration items to be applied, the configuration controller may send a negative indication to the node 130, such as a "configuration failure" indication. The node 130 may communicate this indication to the deployment manager 120, which may communicate the indication to the user/automated system 110. In some cases, the node 130 may delete itself in response to such a failure indication. The node deletion may also be performed by the configuration controller 140 or the deployment manager 120.

Figure 4:
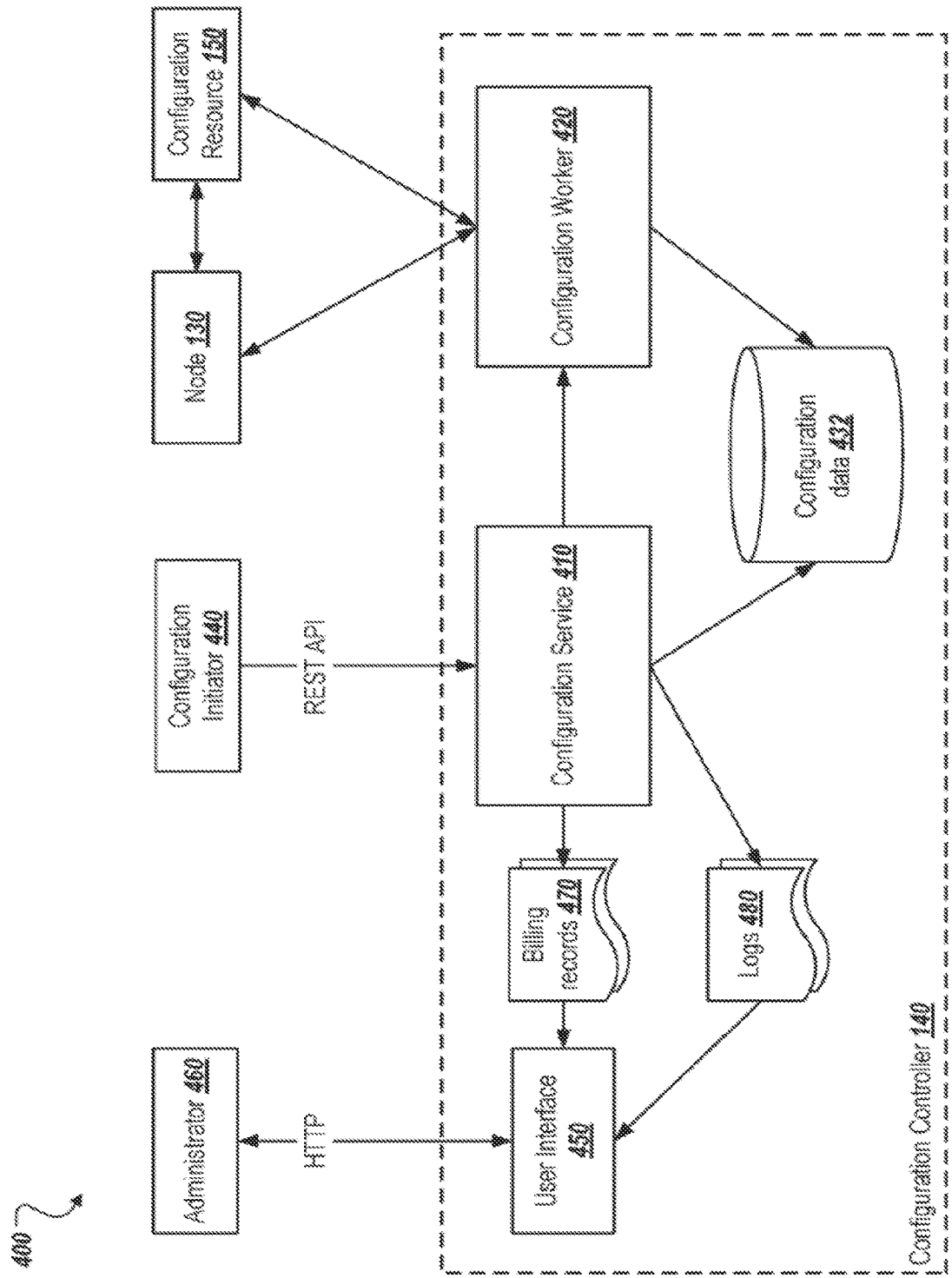
FIG. 4 is a diagram of an example configuration controller used in the environment of FIG. 1.

FIG. 4 is a diagram of an example environment 400 including the configuration controller 140 shown in FIG. 1. As shown, the configuration controller 140 includes a configuration service 410, the configuration worker 420, a set of configuration data 432, and a user interface 450. In operation, a configuration initiator 440 may communicate with the configuration service 410 using a REST API. The configuration initiator 440 may indicate to the configuration servers 410 that a new node 130 has been deployed and will be requesting, configuration from the configuration controller 140. In some cases, the configuration initiator 440 may be the user/automated system 110 shown in FIG. 1, the deployment manager 120 shown in FIG. 1, or any other computing component or entity that is deployed or created the node 130. The configuration initiator 440 may indicate information about the node 130, such as unique identifying information for the node 130 or for the request that caused the node 130 to be deployed or created. This information may be used to verify the request for configuration received by the configuration controller 140 is from the node 130 that has been created or deployed by the configuration initiator 440.

In response to receiving such indication from the configuration initiator 440, the configuration service 410 may assign the task of configuring the node 130 to configuration worker 420. In some implementations, the configuration worker 420 may be a software component, such as a thread, module, or object, including functionality necessary to handle a configuration request from the node 130 and provide the necessary configuration commands to the node 130 to perform the necessary configuration. In some cases, the configuration service 410 may also cause a request for configuration identified as originating from the node 130 to be routed to the configuration worker 420 assigned to configure the node 130, such as by configuring a network module (not shown) responsible for internal routing of received messages within the configuration controller 140. Once the configuration worker 420 receives the request for configuration from the node 130, it may interact with the node 130 in the configuration resource 150 to configure the node 130 as described relative to FIGS. 1 through 3.

The configuration service 410 and the configuration worker 420 may create and maintain a set of configuration data 432. In some implementations, the configuration data 432 may include information on pending configuration operations, the results of previous configuration operations (e.g., success or failure), or recovery data used to restore or resume pending configuration operations in the event of a failure of the configuration controller 140.

As shown, the configuration service 410 creates billing records 470 and logs 480. In some implementations, the billing records 470 and the logs 480 include information about completed configuration operations. For example, the billing records 470 may include charges to be billed to the configuration initiator 440 or another entity for the successful deployment of the node 130. The logs 480 may include detailed information regarding the configuration process for the node 130, such as which configuration commands were issued by the configuration controller 140, and the results of the commands. Logs 480 may provide a historical record of the activity of the configuration controller 140.

User interface 450 provides access to information from the billing records 470 logs 480 to administrator 460. For example, the administer 460 may use a web browser to access the user interface 450 over a network using HTTP, and may retrieve a webpage from the user interface including information from the billing records 470 and the logs 480. In some implementations, the user interface 450, or a different user interface than shown may allow the administrator 460 to search for information in the billing records 470 and the logs 480, filter the information, view the information in different ways, export the information to different formats, or perform other operations.

Figure 5:
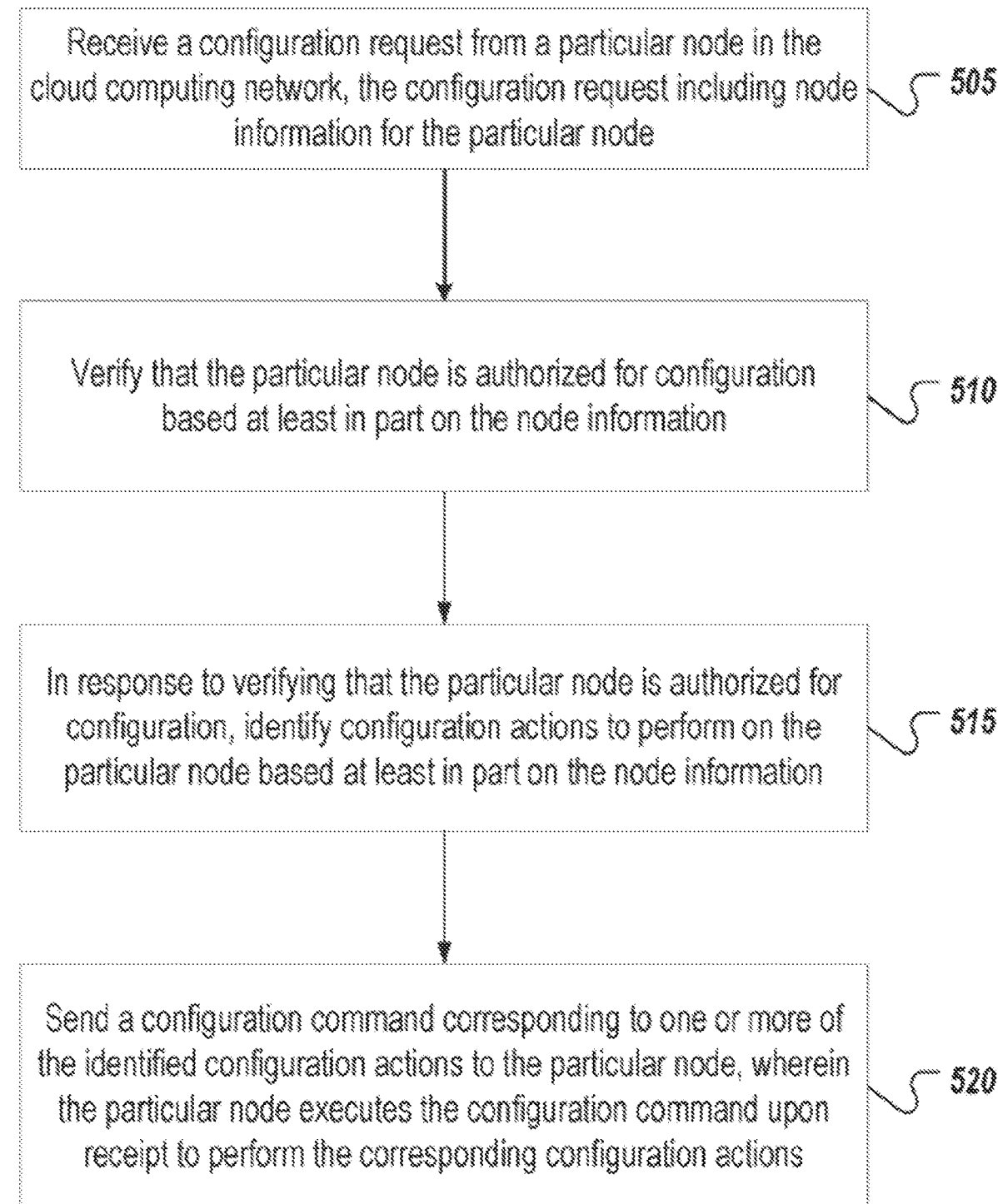
FIG. 5 is a flowchart of an example process for securely configuring resources in a cloud computing system.

FIG. 5 is a flowchart of an example process 500 for securely configuring resources in a cloud computing system. For clarity, the process 500 will be described in relation to the components shown in FIG. 1. At 505, the configuration controller 140 receives a configuration request from a particular node 130 in a cloud computing network. In some cases, the configuration request includes node information for the particular node. The node information may include an identity of the particular node.

At 510, the configuration controller 140 verifies that the particular node 130 is authorized for configuration based at least in part on the node information. In some cases, verifying that the particular node 130 is authorized for configuration includes the configuration controller 140 sending, over the network, an information request to the particular node 130, receiving, over the network, a response to the information request from the particular node 130, verifying that the received response from the particular node 130 matches an expected response. In some implementations, the information request includes one or more commands to be executed by the particular node 130 upon receipt, and the response to the information request includes output produced by execution of the one or more commands by the particular node 130. Verifying that the particular node 130 is authorized for configuration may also include determining that an administrative component associated with the cloud computing network created a node with node information matching that received from the particular node 130, and that the node has yet to be configured. In some implementations, the node information includes creation information detailing how the particular node 130 was created, and verifying that the particular node 130 is authorized for configuration includes verifying that the creation information matches a security policy associated with the cloud computing network. The creation information may include at least one of an administrative component that created the particular node 130, a user of the administrative component who created the particular node 130. a project for which the particular node was created, or a node type for the particular node 130.

At 515, as previously discussed relative to FIG. 1, in response to verifying the particular node 130 is authorized for configuration, the configuration controller 140 identities configuration actions to perform on the particular node 130 based at least in part on the node information. At 520, as previously discussed relative to FIG. 1, the configuration controller 140 sends a configuration command corresponding to one or more of the identified configuration actions to the particular node 130, and the particular node 130 executes the configuration command upon receipt to perform the corresponding configuration actions.

In some cases, the process 500 further includes the configuration controller 140 receiving, over the network, a configuration report corresponding to the configuration command from the particular node 130, the configuration report including reporting information related to the execution of the configuration command by the particular node 130.

In some cases, the configuration command is a first configuration command, and the process 500 further includes the configuration controller 140 determining that the first configuration command was executed successfully by the particular node 130 based on the reporting information, and in response to determining that the first configuration command was executed successfully, sending, over the network, a second configuration command corresponding to one or more additional configuration actions to the particular node 130, wherein the one or more additional configuration actions are selected from the identified configuration actions and are different than the configuration actions corresponding to the first configuration command.

In some implementations, the process 500 further includes the configuration controller 140 determining that the configuration command was not executed successfully by the particular node 130 based on the reporting information, and in response to determining that the configuration command was not executed successfully, notifying an administrative component associated with the particular node 130 that the particular node 130 was not configured successfully.

Figure 6:
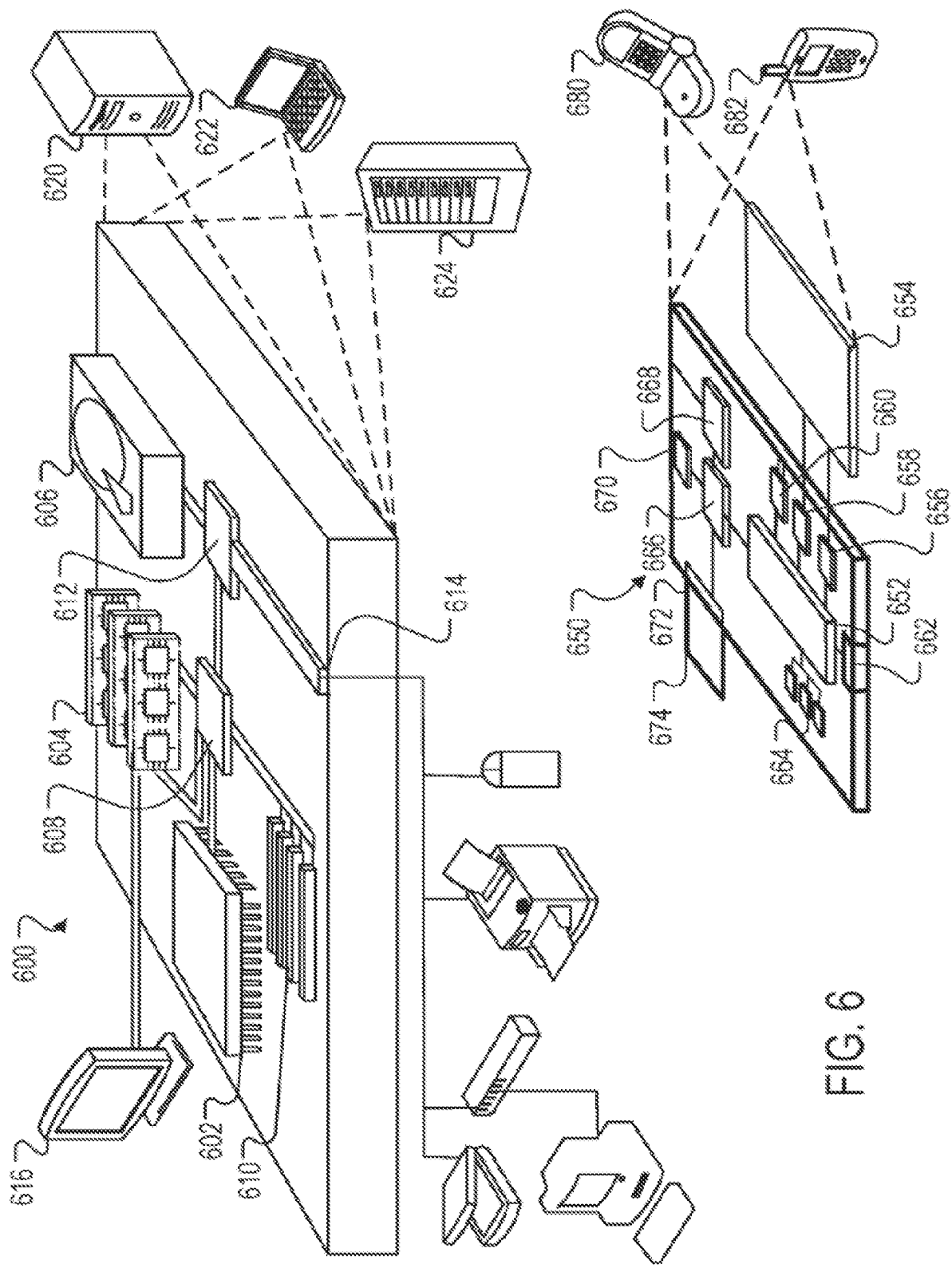
FIG. 6 is a diagram of computing devices that may be used to implement the systems and methods described in this document.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers Computing device 650 is intended to represent various forms of mobile devices, such as personal digital assistants, cellular telephones, smartphones, and other similar computing devices. Additionally computing device 600 or 650 can include Universal Serial Bus (USB) flash drives. The USB flash drives may store operating systems and other applications The USB flash drives can include input/output components, such as a wireless transmitter or USB connector that may be inserted into a USB port of another computing device. The components shown here, their connections and relationships, and their functions, are meant to be exemplary only, and are not meant to limit implementations of the disclosure described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations Such allocation of functions is exemplary only. In one implementation, the high-speed controller 608 is coupled to memory 604, display 616 (e.g., through a graphics processor or accelerator), and to high-speed expansion pons 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers Ii may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips dial include separate and multiple analog and digital processors. Additionally, the processor may be implemented using any of a number of architectures. For example, the processor 610 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may include appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition. GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network) Examples of communication networks include a local area network ("LAN"), a wide area network ("WAN"), peer-to-peer networks (having ad-hoc or static members), grid computing infrastructures, and the Internet. The components of the system can also be computing devices (e.g., clients or servers) including one or more virtual environments for executing software instances, such as virtual machine instances or container instances. The virtual environments may provide virtual representations of hardware, software, and other resources to the executing software instances.

The computing system can include clients and servers. A client and server are generally remote from each other and typically interact through a communication network. The relationship of client and server arises by virtue of computer programs running on the respective computers and having a client-server relationship to each other. In some implementations, the servers may be nodes within a cloud computing system accessed by the clients over a communication network.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method when executed by data processing hardware causes the data processing hardware to perform operations comprising:
   receiving a request from a user system to create and provision a virtual machine in a cloud computing network, the request comprising attributes associated with the virtual machine to be created and provisioned;
   verifying that the user system is authorized to create and provision the virtual machine; and
   in response to verifying that the user system is authorized to create and provision the virtual machine:
   creating the virtual machine;
   identifying one or more actions to provision the created virtual machine based on the attributes associated with the virtual machine;
   sending, to the created virtual machine, a command corresponding to the one or more actions, the command, when received by the created virtual machine, causing the created virtual machine to execute the command and perform the corresponding one or more actions to provision the created virtual machine;
   receiving, from the created virtual machine, reporting information related to the execution of the command by the created virtual machine;
   determining that the command was executed successfully by the created virtual machine based on the reporting information; and
   in response to determining that the command was executed successfully, sending a second command corresponding to additional actions to the created virtual machine, the additional actions different than the corresponding one or more actions.

2. The method of claim 1, wherein the operations further comprise sending, to the user system, acknowledgement that the created virtual machine was created.

3. The method of claim 1, wherein the request further comprises an identity of the user system.

4. The method of claim 1, wherein the attributes comprise a type of virtual machine instance.

5. The method of claim 4, wherein:
   the request comprises a policy based on the type of virtual machine instance; and
   the command based on the policy.

6. The method of claim 1, wherein the request further comprises a unique identifier for identifying the request.

7. The method of claim 1, wherein determining whether the command was executed successfully by the created virtual machine based on the reporting information comprises receiving a report from the created virtual machine.

8. The method of claim 1, wherein the operations further comprise, in response to determining that the second command was not executed successfully, notifying an administrative component associated with a second created virtual machine that the second created virtual machine was not configured successfully.

9. The method of claim 1, wherein verifying that the user system is authorized to create and provision the virtual machine comprises verifying that the attributes match a security policy associated with the data processing hardware.

10. A system comprising:
data processing hardware; and
memory hardware in communication with the data processing hardware, the memory hardware storing instructions that when executed on the data processing hardware cause the data processing hardware to perform operations comprising:
receiving a request from a user system to create and provision a virtual machine in a cloud computing network, the request comprising attributes associated with the virtual machine to be created and provisioned;
verifying that the user system is authorized to create and provision the virtual machine; and
in response to verifying that the user system is authorized to create and provision the virtual machine:
creating the virtual machine;
identifying one or more actions to provision the created virtual machine based on the attributes associated with the virtual machine;
sending, to the created virtual machine, a command corresponding to the one or more actions, the command, when received by the created virtual machine, causing the created virtual machine to execute the command and perform the corresponding one or more actions to provision the created virtual machine;
receiving, from the created virtual machine, reporting information related to the execution of the command by the created virtual machine;
determining that the command was executed successfully by the created virtual machine based on the reporting information; and
in response to determining that the command was executed successfully, sending a second command corresponding to additional actions to the created virtual machine, the additional actions different than the corresponding one or more actions.

11. The system of claim 10, wherein the operations further comprise sending, to the user system, acknowledgement that the created virtual machine was created.

12. The system of claim 10, wherein the request further comprises an identity of the user system.

13. The system of claim 10, wherein the attributes comprise a type of virtual machine instance.

14. The system of claim 13, wherein:
the request comprises a policy based on the type of virtual machine instance; and
the command based on the policy.

15. The system of claim 10, wherein the request further comprises a unique identifier for identifying the request.

16. The system of claim 10, wherein determining whether the command was executed successfully by the created virtual machine based on the reporting information comprises receiving a report from the created virtual machine.

17. The system of claim 10, wherein the operations further comprise, in response to determining that the second command was not executed successfully, notifying an administrative component associated with a second created virtual machine that the second created virtual machine was not configured successfully.

18. The system of claim 10, wherein verifying that the user system is authorized to create and provision the virtual machine comprises verifying that the attributes match a security policy associated with the data processing hardware.

* * * * *